Figure 1:
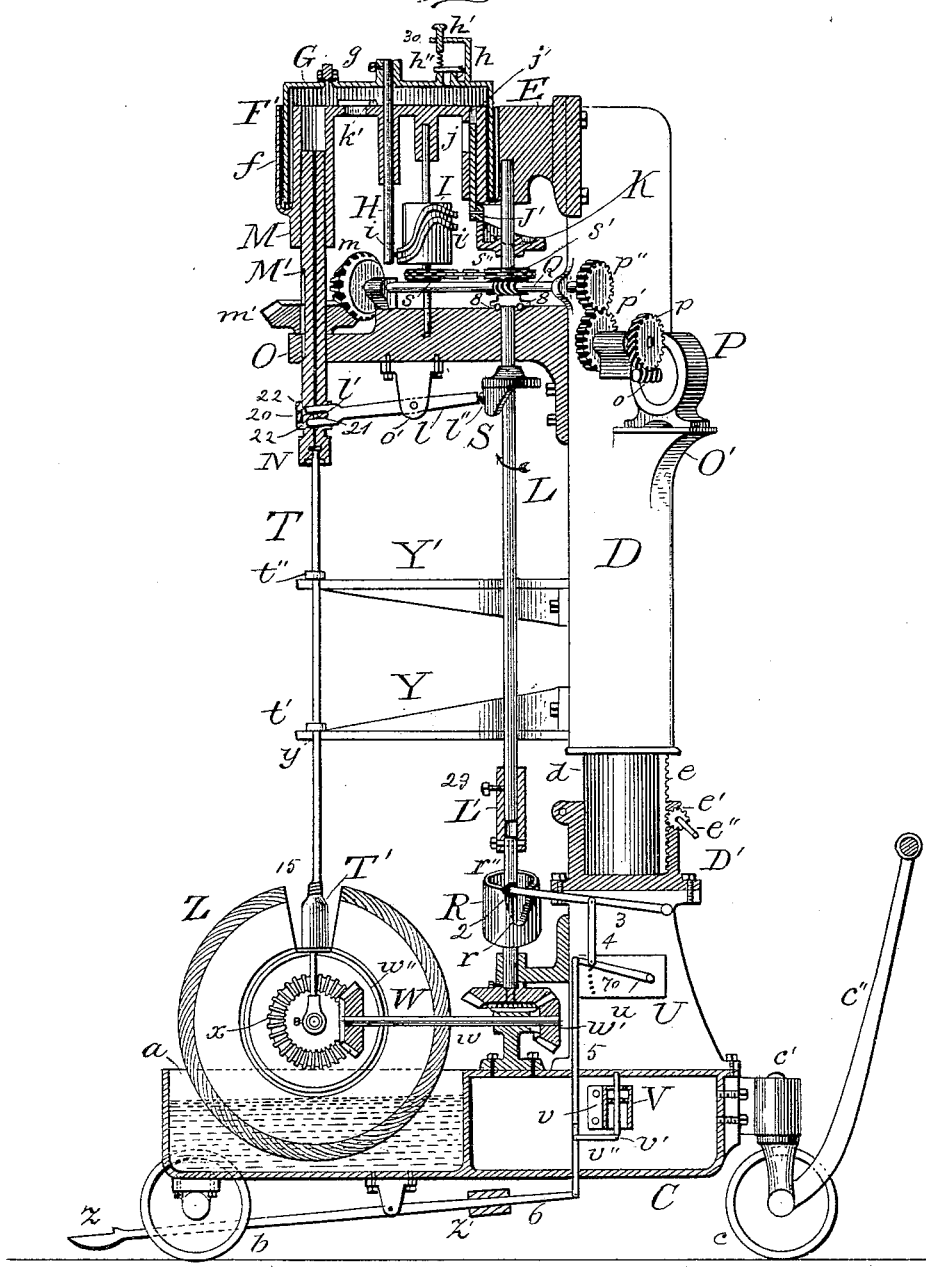

No. 620,567. Patented Mar. 7, 1899.
I. W. COLBURN.
GLASS WORKING MACHINE.
(Application filed Feb. 26, 1898.)

(No Model.) 3 Sheets—Sheet 1.

Witnesses.
J. M. Fowler Jr.
Walter P. Payne.

Inventor:
Irving W. Colburn
by Henry H. Bates
his Attorney.

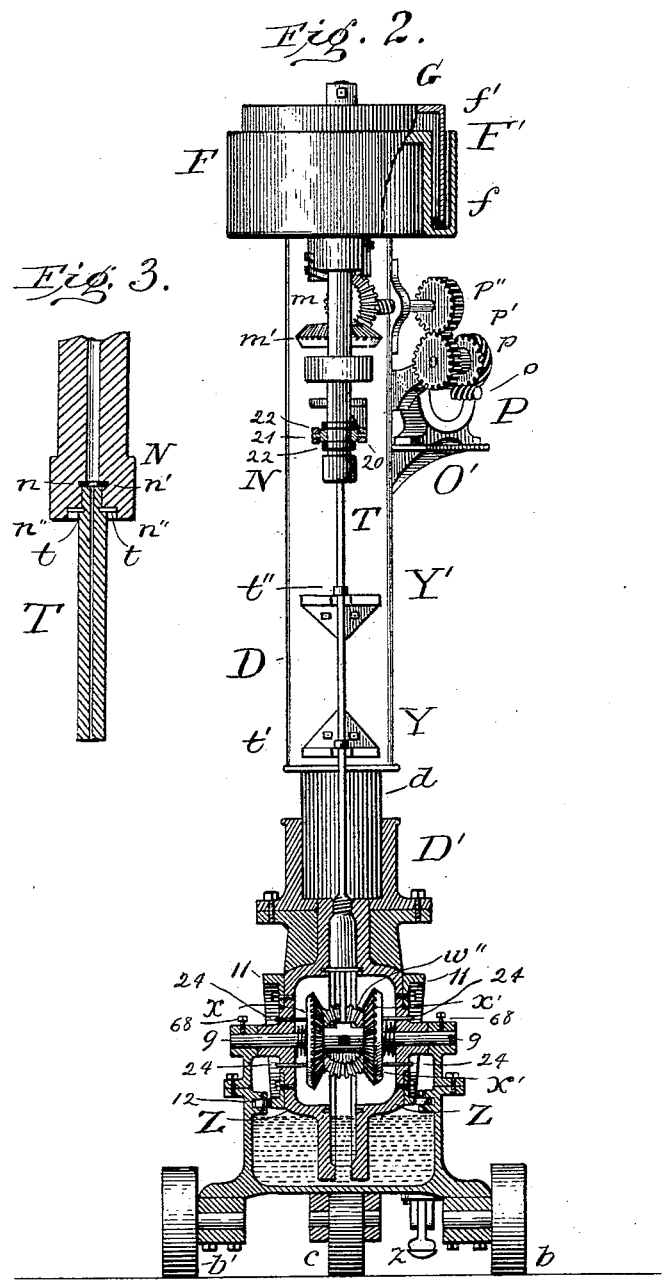

No. 620,567. Patented Mar. 7, 1899.
I. W. COLBURN.
GLASS WORKING MACHINE.
(Application filed Feb. 26, 1898.)

(No Model.) 3 Sheets—Sheet 3.

Witnesses:
J. M. Fowler Jr.
Walter B. Payne.

Inventor:
Irving W. Colburn
by Henry H. Bates
his Attorney

UNITED STATES PATENT OFFICE.

IRVING W. COLBURN, OF TOLEDO, OHIO.

GLASS-WORKING MACHINE.

SPECIFICATION forming part of Letters Patent No. 620,567, dated March 7, 1899.

Application filed February 26, 1898. Serial No. 671,798. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

My invention relates to a novel means or apparatus for carrying into operation a new mechanical method of forming or manufacturing articles of glass such as have heretofore been made by blowing in connection with sectional molds either purely by manual process or in conjunction with machinery. By my present method I dispense entirely with molds and form the article by means of rotating disks, preferably one on each side of the mass of plastic glass to be operated upon, concentrically channeled in the inverse sectional shape of the article to be formed, which disks by rotating in contact with the glass made plastic by high heat model, shape, and form the article under rolling contact and pressure until it assumes its final form as it cools. The plastic glass is commonly supported between the rotating disks by means of a gathering-iron, preferably tubular, to serve for introducing air within the mass of glass to fill the cavity as it expands, said air being introduced either under pressure to positively expand the glass or passively in case the centrifugal force of the rotating mass is wholly relied on to expand it into close contact with the forming-disks. The disks may be rotated either in opposite directions or in the same direction with differential rates of speed, and the plastic mass of glass may be arranged to be either positively rotated in the same direction as or in opposite direction to that of the moving surfaces of the disks, or it may be arranged to be passively rotated by frictional contact with the moving surfaces of the disks. The disks also may be arranged to passively rotate by frictional contact with the surface of the revolving mass of plastic glass when the latter is positively rotated in case it is deemed preferable for any reason to impart rotation in this form. By the said mechanism, which is automatic, I am enabled to form articles of glass which have hitherto required a high degree of manual skill for their production with only such a moderate degree of skill as is necessary for the changing of the gathering-irons, primarily manipulating the same, placing and removing the changed irons, and starting the machine.

In this machine the disks make but one revolution for one operation or rolling of glass. A section of each disk being cut out leaves a place for inserting the blow-iron with a bulb of plastic glass on end of same, and after the operation is complete, the roller-disks having made one revolution, the blown article is removed through the same opening. By two rollers running against sides of an increasing-cam the disks are brought together and separated, as the case may demand. The disks are free to slide on the shaft, being pressed constantly apart by means of two spiral springs, but held in contact with springs by rollers and increasing cams. The operation of the disks is as follows: The disks commence to make their one revolution when in the position nearest each other. The glass is expanded with air-pressure, constantly increasing as the glass takes shape and hardens. As the glass expands the disks are gradually separated by means of the cam and antifriction-rolls until they have completed their one turn, at which time the glass has reached its desired shape and size. This constant separation of the disks follows the article, admitting of a constant pressure for rolling and forming the surface. This type of disk, making one revolution for one rolling of a plastic-glass article, by having depressions around the sides of same, will allow the glass to be formed into other shapes besides cylindrical. These depressions can be so planned that articles produced can be rectangular, triangular, elliptical, or spiral. Any two or more shapes can be rolled on the article with one operation and one heating. In addition to rolling the above-stated shapes pattern work, raised or depressed, can be rolled as handily as plain work. This can be done by having the pattern desired engraved, chased, or wrought upon the sides of the two disks in duplicate, so that they will register as the rotation of the article continues. Screw-threads can be rolled on glass articles by means of raised portions on the disks which will form or roll such shapes.

Figure 4:
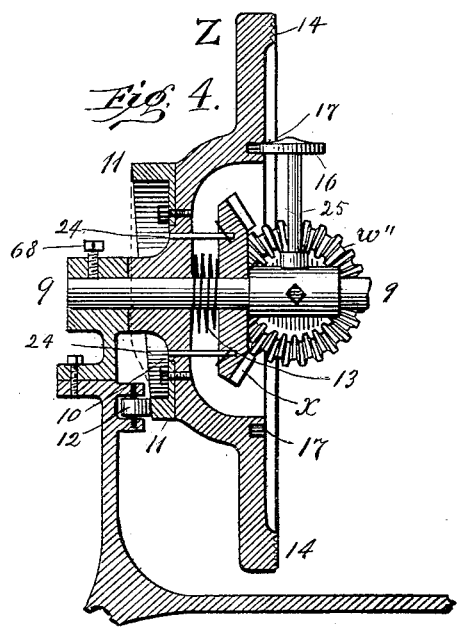
Figure 5:
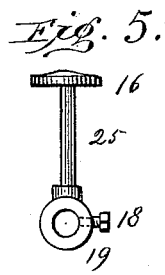
Figure 6:
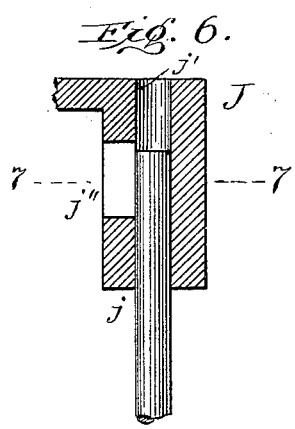
Figure 9:
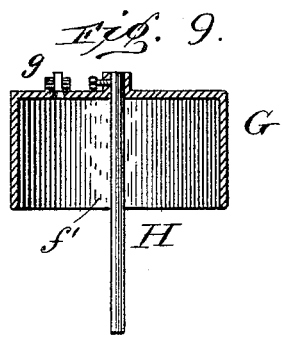
Figure 10:
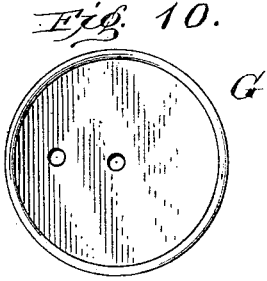
Figure 7:
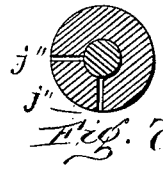
Figure 8:
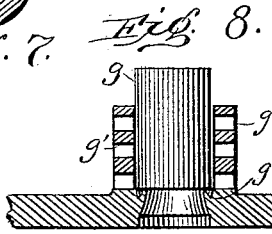

In the drawings forming a part of this specification, Figure 1 is a side elevation of the apparatus, partly in section. Fig. 2 is a front elevation of the same, also partly in section. Fig. 3 is a vertical section, in enlarged detail, of chuck for retaining the blow-iron. Fig. 4 is a vertical sectional view of the disk former, showing driving means, controlling-cam, &c. Fig. 5 is an elevation of bottom slicker with means for mounting between disks. Fig. 6 is a vertical sectional view of air-pressure-regulating valve. Fig. 7 is a horizontal section of air-pressure-regulating valve, taken on line 7 7, Fig. 6. Fig. 8 is a vertical sectional view of constant-pressure-regulating gravity-valve. Fig. 9 is a vertical section of the moving part of the air-pressure generator. Fig. 10 is a plan view of the same.

Like letters and numerals of reference refer to like parts in the several drawings.

Referring to the drawings, C represents the base of the machine, cored for lightness and containing water-tank $a$. The machine is mounted for convenience and portability on rollers $b$ $b'$ $c$, of which roller $c$ is swiveled, as at $c'$.

D is an upright main standard borne on the base C and having overhanging arm E for supporting the upper mechanism. Standard D is made extensible for adjustment to different species of work by means of cylindrical portion $d$, fitting into cylindrical cavity D' and carrying rack $e$, which can be adjusted up or down by means of pinion $e'$ and winch $e''$. A clamp-screw, ratchet-bar with pawl, or other suitable means (not shown) is employed to keep the main standard in position when necessary to elevate the same.

F is an air pressure and supply tank having stationary part F', borne on overhanging arm E. G is the movable portion of said air-pressure regulating and supply tank.

$g$ is the constant-pressure-regulating gravity-valve, borne in perforated socket $g'$, seated on knife-edged seat $g''$.

$h$ is the adjustable pressure-regulating valve, having adjusting-screw $h'$ and spring $h''$.

H is the vertical shaft by which the movable portion or cover G of the air-pressure regulator is operated.

$f$ is the liquid-seal cavity, in which the part G moves up and down, being practically filled with some permanent liquid—as mercury, oil, or glycerin—to prevent the escape of the air under pressure in the cavity $f'$.

I is the cam which operates and controls the height of the cover G through shaft H, pin $i$, and cam-grooves $i'$.

J is the variable automatic air-regulating valve, having piston $j$, moving in tubular passage or outlet $j'$ from the air-tank, and $j''$ $j''$ are slitted apertures controlled by said piston $j$.

J' is the antifriction-roller, by which piston $j$ is controlled as it rolls upon edge cam K, borne on shaft L.

L is the main rotary shaft, supported on ball-bearings 8 8.

$k'$ is an inlet-valve for admitting air to the air-tank F.

M is a vertical outlet tube or passage for air leading from air-tank F, so as to make connection with the blow-iron.

M' is a vertical tubular shaft or air-spindle moving freely up and down in air-outlet tube M, but so as to be air-tight. This hollow shaft or "air-spindle" bears a clutch N on its lower extremity. (Shown in detail in Fig. 3.) It has an inner groove $n$ and elastic washer $n'$ for seating the end of the blow-iron air-tight and transverse slits $n''$ $n''$, engaging with pins $t$ $t$, borne on the upper extremity of the blow-iron, by which the latter is caused to rotate with the air-spindle.

On the main standard D is secured a second overhanging arm O, through which pass both the air-spindle M' and the main rotary shaft L. Said main rotary shaft receives its motion from some external source of power, preferably an electric motor, (shown at P,) borne on a bracket O', attached to main standard D. A train of gears $p$ $p''$ $p''$ transmits the rotary motion of the motor-armature from worm $o$ to shaft Q, whence rotary motion is conveyed to main shaft L through worm Q' and a worm-gear on said main shaft, with which said worm Q' engages. Shaft Q also transmits rotary motion to the air-spindle M' by means of gears $m$ $m'$, only one of which is in the sectional plane, the said air-spindle being splined where it passes loosely through gear $m'$ to permit of free longitudinal motion. Main rotary shaft L also transmits rotary motion to cam I by means of sprocket-gears $s$ $s'$ and chain $s''$. The vertical movements of air-spindle M' are controlled by cam S on main shaft L through lever $l$, having fork $l'$ and roller $l''$. Said lever is supported on arm O by hanger $o'$. The fork $l'$ operates on the air-spindle by means of a ring 20, having trunnions 21, which engage the prongs of the fork, the ring being confined against lateral motion on the spindle by collars 22 22 above and below, which permit the spindle to rotate freely. The main rotary shaft L is made extensible by sleeve L' to correspond with extension D' $d$ of main standard D.

R is an edge cam for controlling the stoppage of the machine and also the gradual application of power during the automatic operation of forming. It has a deep portion at $r$, with a quick descent thereto and also a quick rise therefrom for a short portion of its turn, from whence there is a gradual rise throughout the major part of its course to the highest point thereof at $r''$ just before the final descent, which shuts off the operation of the machine. The roller 2 rides on the edge of this cam and controls lever 3, which through link 4 is attached to radius-arm $u$ of the rheostat U, by which the admission of current to the motor-armature is regulated and controlled. This radius-arm is also connected, by means of link 5, to lever 6 of treadle Z, through which the machine is started. A retarder V, which may be an air dash-pot, is secured to the base of the machine and has a piston $v$ and stem $v'$, connected to link 5 by arm $v''$. The function of this retarder is to prevent the too sudden application of power through treadle Z, which else might strain the mechanism and injure the armature of the motor.

T is the blow-iron, adapted at its upper end to engage with clutch N by means of pins $t\,t$. It has the customary enlargement $t'$ for seating and sustaining it in its seat $y$ on bracket-arm Y, borne on main standard D, and has preferably also a collar $t''$ where it engages bracket-arm Y', borne also on the main standard.

Rotary motion is transmitted from main rotary shaft L to the formers through gears $w\,w'$, shaft W, and gear $w''$, meshing with loose gears $x\,x'$. These gears are all preferably made interchangeable to provide for differentials of speed to accommodate different classes of work.

The formers Z Z are shown in elevation in Fig. 1 and in section in Fig. 2. They are in disk form, having their faces made to conform in section to the contour of the article to be shaped. They are rotatably mounted on fixed shaft 9 facing each other and are connected with the loose gears $x\,x$, from which they receive motion by the pins 10 10, attached to said gears $x\,x$, and, passing through apertures in the formers Z Z, allowing of their expansion and contraction to and from each other while in rotation. This lateral motion of the disks is governed by edge cams 11 11 on the rear of each disk running against rollers 12 12. Springs 13 13 are inserted between the disks and the respective gears which drive them for the purpose of keeping said gears in mesh with the driving-pinion $w''$, while providing for the proper expansion of the disks and keeping the cams in contact with rollers 12 12. The disks or formers Z Z have on their margins creases 14 so formed as to make a screw-thread on the neck of the article to be manufactured. 15 is a notch or recess made in each disk to admit of the glass being placed in position at starting, the disks being then in their closest position and making but one revolution from start to finish. Said disks run at their lowermost margins in the water in the tank $a$ for wetting and cooling purposes. Between the said disks, supported on fixed shaft 9, is mounted the forming-tool or slicker 16 for forming the bottom of glass articles while being acted on by the rotating disks. A crease 17 is provided for the edge of the said forming-tool or slicker to run in and make close contact during the expansion and contraction of the disks. Said forming-tool or slicker is adapted to be paste-covered when the class of work is such as to require it. 18 is the clamp-screw for fixing the sleeve 19 of the forming-tool or slicker on the shaft 9. Said sleeve 19 is long enough to occupy the space between the loose gears $x\,x$ and keep them truly in mesh with bevel-gear $w''$ while being pressed from the rear by springs 13. The faces of the disk formers may also be so made as to model articles of other shapes than round, as prismoidal figures with polygonal or elliptical bases, it being only necessary to so model, form, or sculpture the working face of the rotatable disk as to match the configuration of the article designed to be produced when the two rotate in contact.

The drawings represent the machine just completing an operation of blowing and rolling a plastic-glass article, said article being shown at T'. The machine is just coming to rest, as will be seen by the roller 2 on cam R. When roller 2 is at its lowest position on cam R, it will rest at bottom $r$ of said cam. In this position the machine is at rest, and the different parts are in the following positions: The rheostat-arm $u$ is at bottom of rheostat U on electrical buttons 70. When at this position, the current is shut off from the armature of the electric motor, thus stopping its motion. The treadle Z is in its highest position. The piston $v$ in air-brake cylinder V is at its lowest position. Roll $l''$ is on lowest position of cam S. This has raised lever-fork $l'$ and with it has raised the blow-iron spindle M' to its highest position free from the blow-iron, admitting of the blow-iron being taken out and a fresh one placed in the machine with a fresh gathering of plastic glass on same. Cam I has turned on its axis sufficiently to have lifted the shaft H, with its air-receptacle, to its highest position. Cam I, having lifted this shaft H by coming in contact with the roll $i$, has lifted the air-tank cover G. The valve $k'$ has also lifted and allowed air to fill the supply air-tank at atmospheric pressure with a sufficient amount of air to furnish a much greater supply than is required for actual requirements in blowing the plastic-glass article. This air-tank or pressure air-reservoir is sealed against escape of air by the liquid in chamber $f$ of receptacle F'. The cam K has revolved sufficiently to allow shaft $j$ to drop to its lowest position, thus leaving an air-escape through the thin slot $j''$. Shaft $j$ receives its perpendicular motion by cam K coming in communication with the shaft through the immediate roll J', which serves to lessen friction. Roller-disks Z have come to rest with the openings 15 in same opposite each other. They are also spread apart at the greatest distance that the circular cams 11 11, coming in contact with the rolls 12 12, will allow. At such position the rolls rest on the thinnest part of cams 11. Spiral springs 13 13 are at their greatest expansion, thereby having pressed the roller-disks Z Z apart.

Roller-disks Z Z are a loose fit on shaft, sufficiently so to admit of their sliding back and forth on same as the spiral springs 13 13 and cams 11 11 put in their work. They are caused to revolve on the fixed shaft 9, which is held in one position at all times by set-screws 68 68'''', by means of the four driving-pins 24 24 24 24, which are fitted loosely in the roller-disks Z Z and held securely to the gears *x x*. These gears thus serve to give rotary motion to the roller-disks through these driving-shafts 24 24 24 24.

The slicker or forming-tool, Fig. 5, for bottom of base of plastic glass is at all times held in one position on the fixed shaft 9 by means of the set-screw 18. This is held upright in its correct position by means of stem 25. There is a circular slot 17 cut entirely around each of the roller-disks Z Z, in which this slicker or forming-tool sets a greater or less distance as the distance apart of the roller-disks diminishes or increases. By having this slicker or forming-tool of different shapes on top the plastic glass is given any desired shape at bottom. This is generally paste-covered on top where it comes in contact with the plastic glass.

In the base C of the machine is receptacle *a* for holding water for wetting and cooling the faces of the roll-disks or formers. These disk-faces can be paste-covered or not, as the case may demand, depending on the work in hand.

Before starting the machine to roll plastic glass it is necessary to adjust the same to conform with the article to be worked and the length of blow-irons. This is done by means of rack-gear *e*, pinion *e'*, and winch *e''* raising or lowering the main standard D, as desired, until in correct position. This is securely clamped after being set by clamp and cap screw or other suitable means. (Not shown.) Coupling L' is fitted fast to shaft L at bottom part and loosely at top part and held to top part by the set-screw 23. When the machine is being adjusted, this set-screw 23 is loosened and remains so until the machine has reached its correct adjustment, at which time it is tightened, thus being enabled to communicate power to lower mechanism, as designed.

Having described the different positions of parts of the machine while at rest, I now will describe the starting of the machine and the operation thereof. The blow-iron, with its gathering of plastic glass properly manipulated, is placed in the machine. This blow-iron or gathering-iron is held in position by brackets Y Y'. At *t* on blow-iron is an enlargement that prevents same from dropping too low. On bracket-arms Y Y' are suitable clamps of well-known construction for holding the blow-iron during the operation, which are easily sprung apart in putting in and taking out the said iron. Immediately after placing the blow-iron in bracket-arms Y Y' the operator's foot is applied to the treadle Z. This treadle is prevented from moving down too fast by the retarder or air-brake cylinder V, which exerts a gradually-releasing resistance by reason of air escaping through air-holes located in some part of air-cylinder. This foot motion has commenced to move rheostat-arm gradually across the electric contacts 70 on rheostat of the motor. The motor at once begins to move, communicating power through the gearing to different parts of the machine. The shaft L having commenced its rotation the cam S commences to operate lever *l* through its immediate connecting-roller 26. As soon as motor has received its first revolution the machine is automatic from then on until the plastic-glass article is blown and rolled. Regulation of speed is obtained by the constantly-increasing cam R. As the roller 2 raises on this cam from its point *r* of lowest depression it raises the rheostat-arm correspondingly. This admits more current to the motor-armature, and thereby increases the speed of same. This cam by varying the position of the rheostat-arm can be made to give the machine any desired speed at any part of its operation. The roller-disks Z beginning to revolve at once approach each other, coming rapidly together against the pressure of springs 13 13 by reason of the rollers 12 12 riding directly on the highest part of circular cams 11 11. By this move they have come in contact with the expanding plastic glass and at once begin to separate as the glass expands under varying pressure. The roller-disks can come together fast or slow by giving the cams 11 11 such a shape as to accomplish the desired ends, these cams being interchangeable. Power is applied to the roller-disks from the shaft L through the coupling L' and thence through bevel-gears *w w'*, thence through the shaft W, gear *w''*, loose gears *x x*, and pins 24, which convey the rotary motion of said gearing to the movable disks or formers. The air-tank or pressure-reservoir is now at its highest position. This at once begins to descend, motion being given to same by shaft H, roll *i*, cam I, sprocket-wheel S, sprocket-chain S'', and sprocket-wheel S' from shaft L. This pressure-tank can be given any desired variation in speed of descent by the cam I, properly proportioned and shaped. Were it not for the escape-valve J, Fig. 6, much too great pressure would be at once applied to the plastic glass. The glass being in a very plastic state, light pressure is required during first part of the operation. This pressure is governed by the escape-passages *j''* and the plunger *j*. As the glass begins to expand and cool the air-pressure is automatically increased. This can be done by varying the speed of descent of the air-pressure tank, also by gradually closing the air-escape valve by means of the cam K on shaft L, thereby making the pressure anything desired.

During the latter part of the operation it is desirable that the air-pressure shall never increase beyond certain limits, this limit being determined by the size of the article and the thickness of walls of same. I provide for such a fixed limit of pressure by two air-pressure valves (illustrated in Fig. 1) on top of movable tank-cover G. But one is required on one machine at one time; but I will describe each one. Fig. 8 illustrates a constant-pressure valve. The pressure in this case is determined by the fixed weight of the valve-plunger g. This valve-plunger can be of different weights, according to the work in hand, and changed to accommodate different pressures by having this plunger of different weights to hold against different pressures of air. It being determined what pressure is required for the work in hand and a suitable plunger-valve being placed in valve-opening, it remains air-tight through contact with the knife-edges g'', on which it seats. Immediately on the air-pressure rising above the desired pressure at which it is safe to work the plastic glass in hand this valve-plunger rises from its knife-edge seat and allows air to escape through the holes g''', provided for the purpose, instantly again taking its seat as soon as the air-pressure returns to what the valve is designed to hold.

The second method of controlling the air-pressure is illustrated on the right hand of the top of the machine, Fig. 1. 30 represents a support or arm for adjusting-screw h'. This is in contact with a spiral or otherwise shaped spring h'', holding against the pressure-trap valve or clapper h, covering passage leading to air under pressure in tank I. Immediately on the air-pressure becoming too great it lifts clapper-valve h from its seat against the spring pressure or tension of spring h'', allowing the air to escape and the pressure to fall. Immediately on the reduction of the air-pressure to normal pressure the valve at once closes ready for action again. This valve can be readily set for any desired pressure by means of adjusting-screw h'. The blow-iron has immediately made connection with air-spindle M' by means of mechanical connection with main shaft L, heretofore described, turning cam S and allowing lever l to lower spindle M' until it comes in contact with the blow-iron. Said blow-iron also receives rotary motion from motor P through the train of gearing, as heretofore explained. The spindle M' is free to move up and down through bevel-gear m' and at the same time held so as to revolve with said gear by means of the spline connection. The spindle M', having made connection with the blow-iron, supplies it both with air and rotary motion, being prevented from slipping by a chuck N in end of spindle M'. This chuck is made air-tight by a perforated washer-seat n', against which the end of the blow-iron is seated.

Air is supplied to the blow-iron through tubular air-spindle M' from pressure-air tank F. The machine goes on through its different stages of operation of forming the plastic glass until the latter has taken shape and form and becomes sufficiently hard to be considered complete. Then the machine stops itself automatically, as illustrated and described, and the blow-iron, with its finished product, is removed, when the machine comes to rest. All is then ready for a fresh gathering of plastic glass and another operation.

I claim and desire to secure by Letters Patent—

1. In a glass-working machine, revoluble disk formers for operating on plastic glass having plane faces facing each other in parallel planes, supported on axes so as to freely rotate, in combination with means for supporting a mass of plastic glass in rolling contact with said faces, substantially as specified.

2. In a glass-working machine, a pair of revoluble disk formers, supported in axial alinement, so as to freely rotate, the inner faces of said formers being concentrically channeled in the inverse sectional shape of the article to be formed, in combination with means for supporting a mass of plastic glass in rolling contact with the faces of the said disk formers, substantially as specified.

3. In a glass-working machine, a pair of revoluble disk formers, supported on axes so as to freely rotate, in combination with means for rotating a mass of plastic glass in simultaneous contact with the said disk formers, substantially as specified.

4. In a glass-working machine revoluble disk formers, axially supported facing each other, bearing patterns on their faces, means for positively rotating said disks, and means for positively rotating a mass of plastic glass in contact with the patterned faces of the disks, substantially as specified.

5. In a glass-working machine revoluble disk formers, axially supported facing each other, bearing patterns on their faces, means for positively rotating said disks, means for rotating a mass of plastic glass in contact with the patterned faces of said disks, and means for approximating and separating said disks while rotating, substantially as specified.

6. In a glass-working machine a pair of disk formers, mounted revolubly on a fixed axis, means for rotating said disks, means for supporting a mass of plastic glass rotatably between said disks, means for approximating and separating said disks while rotating, and means for wetting and cooling said disks while rotating, substantially as specified.

7. In a glass-working machine revoluble disk formers, axially supported, bearing patterns on their faces and bearing marginal zones having scroll-shaped incisions, such as when rotated in contact with a rotating mass of plastic glass will impress said glass with screw-shaped forms on a portion of their surfaces, substantially as specified.

8. In a glass-working machine a removable gathering-iron, in combination with revoluble disk formers, bearing patterns on their disk faces, said disks being notched at one point of their circumferences to admit of the insertion between the disks of a mass of plastic glass borne on the end of the said gathering-iron, substantially as specified.

9. In a glass-working machine a removable gathering-iron, in combination with revoluble disk formers bearing patterns on their disk faces, and means for simultaneously rotating said disks and said gathering-iron, substantially as specified.

10. In a glass-working machine a removable blow-iron, means for supplying air under pressure to said blow-iron, and means for rotating the same, in combination with rotatable disks bearing patterns on their disk faces, said disks revolubly mounted with their patterned faces toward each other, and a fixed support borne between said disk faces, for supporting and forming the bottom of an article of plastic glass rotatably held between said disks on the end of said blow-iron, substantially as specified.

11. In a glass-working machine a removable blow-iron, means for automatically rotating the same and simultaneously supplying a blast of air thereto, in combination with rotatable disks bearing patterned faces, and means for rotating said disks and simultaneously approximating and separating them while rotating, substantially as specified.

12. In a glass-working machine revoluble formers, for operating on plastic glass, in combination with a revoluble blow-iron, and means for supplying a blast of air to said blow-iron automatically graduated both as to volume and pressure, substantially as specified.

13. In a glass-working machine a base, an upright main standard, with overhanging arm, revoluble disk formers, having patterned faces, a removable blow-iron, with means for rotating the same, means for supplying air thereto, a main rotary shaft, bracket-arms on the main standard for supporting the blow-iron, and means for extension and adjustment between the members of the main standard and those of the main rotary shaft respectively, substantially as specified.

14. In a glass-working machine an expansible air-tank, means for expanding and contracting the capacity thereof, an air-inlet valve for admitting air to said tank during expansion, an adjustable outlet-valve for permitting the escape of air under adjusted pressure, an air-outlet to a blow-iron, and a valve for automatically regulatng the air-pressure within the said tank, substantially as specified.

15. In a glass-working machine in combination with an expansible air-tank, having an air-inlet valve and an air-outlet to a blow-iron, a constant-pressure-regulating valve, permitting air to escape whenever the pressure within the tank reaches a certain predetermined degree, substantially as specified.

16. In a glass-working machine an expansible air-tank, having fixed portion F′, rising-and-falling portion G, liquid seal *f*, inlet-valve *k′*, regulated-pressure valve *h*, and automatic variable-pressure-regulating valve J, substantially as specified.

17. In a glass-working machine the automatic variable-pressure-regulating valve J, having air-pressure tube *j′*, sliding piston *j*, and air slit or slits *j″*, in combination with expansible air-tank F and rotary cam K for automatically varying the escape-outlet and thereby regulating the air-pressure in said air-tank, substantially as specified.

18. In a glass-working machine in combination, a removable blow-iron, an expansible air-tank in communication therewith, means for automatically expanding and contracting said tank, means for admitting air thereto, means for holding the admitted air at a constant pressure, and means for automatically varying the air-pressure of the air supplied to the said blow-iron, substantially as specified.

19. In a glass-working machine, in combination, an expansible air-tank with an air-inlet thereto, an air-outlet therefrom, a sliding and revoluble tubular air-spindle in said outlet, an air-pressure-regulating valve, a rotary cam for regulating the capacity of the expansible air-tank, a rotary cam for controlling the air-pressure-regulating valve, and a rotary cam for regulating the position of the sliding air-spindle all controlled from one rotary shaft, substantially as specified.

20. In a glass-working machine, in combination, a base, a tank in said base, disk formers having patterned faces revolubly mounted so as to dip in the water in said tank, means for rotating said disks, means for approximating and separating said disks while rotating, a revoluble blow-iron and means for rotating the same, an electric motor, a rheostat for controlling the current supplied to the armature of said motor, and a rotary cam for automatically governing the current allowed to pass through the rheostat, and thus regulating the speed and times of the correlated movements of the machine, substantially as specified.

21. In a glass-working machine a removable blow-iron, means for rotating the same, and means for supplying air to said iron under graduated volume and pressure, in combination with revoluble disk formers, axially supported, and means for approximating and separating said formers, substantially as specified.

22. In a glass-working machine, in combination, a tank, revoluble disk formers dipping in the water in said tank, a vertical air-spindle, capable of rotary and up-and-down movements, an expansible air-tank for supplying air to said air-spindle under pressure, an air-valve for regulating the pressure in said air-tank, an electric motor, a rheostat and a main rotary shaft carrying cams for regulating the air-pressure supplied to the air-spindle, the up-and-down movements of the said air-spindle, and the current passing through the rheostat to the motor-armature, and gears for rotating the air-spindle and the disk formers, substantially as specified.

23. In a glass-working machine an adjustable main standard, an adjustable main rotary shaft, a rheostat, a cam in said main rotary shaft for controlling the rheostat, a treadle connected to said rheostat for turning on the current, and a retarder, for preventing the too sudden application of the treadle to the rheostat, substantially as specified.

24. In a glass-working machine, the combination of rotary disk former Z, edge cam 11, roller 12, fixed shaft 9, loose gear 18, spring 13, pins 24, gear $w''$, and support 16, substantially as specified.

25. The constant-pressure valve, having fixed-weight plunger $g$, perforated guiding-shell $g'$, and knife-edged seat $g''$, substantially as specified.

26. A tubular air-spindle M' terminated by clutch N, having seat $n$, perforated washer $n'$, and slits $n'' n''$, in combination with blow-iron T, having transverse pins $t$, substantially as specified.

In testimony whereof I affix my signature in presence of two witnesses.

IRVING W. COLBURN.

Witnesses:
HENRY H. BATES,
ALEXANDER S. STEUART.